(12) United States Patent
Chen et al.

(10) Patent No.: US 10,099,331 B2
(45) Date of Patent: Oct. 16, 2018

(54) PUNCHING SYSTEM

(71) Applicant: Metal Industries Research & Development Centre, Kaohsiung (TW)

(72) Inventors: Pin-Jyun Chen, Kaohsiung (TW); Hsin-Wei Chu, Pingtung County (TW); Chih-Hao Lin, Kaohsiung (TW); Yu-Ting Lin, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 184 days.

(21) Appl. No.: 15/360,969

(22) Filed: Nov. 23, 2016

(65) Prior Publication Data

US 2018/0141177 A1    May 24, 2018

(51) Int. Cl.
| | | |
|---|---|---|
| *B23Q 3/155* | (2006.01) | |
| *B21D 28/02* | (2006.01) | |
| *B21D 37/14* | (2006.01) | |
| *B21D 28/14* | (2006.01) | |
| *B21D 28/36* | (2006.01) | |

(52) U.S. Cl.
CPC ......... *B23Q 3/15566* (2013.01); *B21D 28/14* (2013.01); *B21D 37/145* (2013.01); *B21D 28/36* (2013.01); *B23Q 3/15539* (2016.11); *B23Q 2003/15537* (2016.11); *Y10T 483/1731* (2015.01); *Y10T 483/1845* (2015.01); *Y10T 483/1882* (2015.01)

(58) Field of Classification Search
CPC ............. B23Q 3/15566; B23Q 3/1556; B23Q 3/15506; B23Q 2003/15537; B23Q 3/155–3/15793; Y10T 483/1729; Y10T 483/1731; B21D 37/145

USPC .................................................... 483/28–29
See application file for complete search history.

(56) References Cited

U.S. PATENT DOCUMENTS

| | | | | |
|---|---|---|---|---|
| 4,423,546 | A | * | 1/1984 | Scott ...................... B21D 28/12 483/29 |
| 4,532,845 | A | | 8/1985 | Jinnouchi |
| 4,901,427 | A | * | 2/1990 | Sakamoto .............. B21D 28/12 483/29 |
| 4,951,375 | A | | 8/1990 | Erlenmaier |
| 5,545,116 | A | * | 8/1996 | Seto ....................... B21D 28/12 483/29 |
| 5,882,285 | A | * | 3/1999 | Seto ....................... B21D 28/12 483/29 |

(Continued)

FOREIGN PATENT DOCUMENTS

EP            1138411           10/2001

*Primary Examiner* — Erica E Cadugan
(74) *Attorney, Agent, or Firm* — JCIPRNET

(57) ABSTRACT

A punching system adapted to punch a sheet metal includes a platform, a punching portion, a base portion and a turret device. The punching portion is disposed on the platform, and a first upper die is detachably installed in the punching portion. The base portion is disposed between the punching portion and the platform, and a first lower die is detachably installed in the base portion. The punching portion is adapted to move back and forth along a first direction relative to the platform. The turret device is adapted to move along a second direction relative to the platform, and the first direction is perpendicular to the second direction. A plurality of second upper dies and second lower dies are correspondingly installed on the turret device.

10 Claims, 8 Drawing Sheets

(56) References Cited

U.S. PATENT DOCUMENTS 7,769,484 B2 * 8/2010 Senda .................... B21D 28/12
                                                                                        483/1
2016/0332217 A1 * 11/2016 Ahlemeyer ............ B21J 15/025

* cited by examiner

PUNCHING SYSTEM

BACKGROUND OF THE INVENTION

Field of the Invention

The disclosure relates to a punching system, and particularly relates to a punching system capable of quickly changing a punching die.

Description of Related Art

Along with development of 3C (computers, communication devices and consumer electronics) and optoelectronic industry, punching process has been widely applied in manufacturing of 3C and optoelectronic products, and becomes one of indispensable and important manufacturing processes. However, in an initial stage of product development, the punching process requires to design, manufacture and test modules. Die development not only requires a long time, a related manufacturing cost thereof is also very expensive. If it is discovered that a design of the product or the die has a problem in a testing phase, and the die is required to be replaced, some large parts on a working platform are required to be disassembled. Therefore, a time and cost required for die replacement are still rather high. Therefore, the conventional punching process is not suitable to be applied to the product testing phase, or a small amount and diversified production and manufacturing.

SUMMARY OF THE INVENTION

The disclosure provides a punching system, which is capable of automatically replacing one punching die with another, so as to save time and labor operation costs of the punching system, and the punching system is adapted to a small amount and diversified manufacturing of punching test pieces.

An embodiment of the disclosure provides a punching system adapted to punch a sheet metal. The punching system includes a platform, a punching portion, a base portion and a turret device. The punching portion is disposed on the platform, and a first upper die is detachably installed in the punching portion. The base portion is disposed between the punching portion and the platform, and a first lower die is detachably installed in the base portion. The punching portion is adapted to move back and forth along a first direction relative to the platform. The turret device is adapted to rotate along an axial direction parallel to the first direction, so as to transfer one of the second upper dies and one of the second lower dies to a pending position of the turret device respectively corresponding to the punching portion and the base portion. The turret device is adapted to move along a second direction towards the punching portion and the base portion, so as to respectively replace the first upper die and the first lower die by the second upper die and the second lower die.

In an embodiment of the disclosure, the punching system further includes a first slide rail. The first slide rail is disposed between the turret device and the platform along the second direction, where the turret device is adapted to slide through the first slide rail relative to the platform.

In an embodiment of the disclosure, the punching system further includes a carriage. The carriage is disposed on the platform, and is configured to carry the sheet metal. The carriage is adapted to move along the second direction relative to the punching portion and the base portion.

In an embodiment of the disclosure, the punching system further includes a clamping portion. The clamping portion is movably disposed on the carriage, so as to detachably fix the sheet metal on the carriage. The clamping portion is adapted to move along a third direction relative to the carriage, and the third direction is orthogonal to the first direction and the second direction.

In an embodiment of the disclosure, the punching system further includes a second slide rail. The second slide rail is disposed between the platform and the carriage along the second direction. The carriage slides along the second slide rail relative to the platform.

In an embodiment of the disclosure, the turret device includes an upper turret portion and a lower turret portion. The second upper dies and the second lower dies are respectively detachably installed on the upper turret portion and the lower turret portion.

In an embodiment of the disclosure, the turret device includes a plurality of carrying arms, and the carrying arms respectively have a holding portion. The second upper dies and the second lower dies are detachably carried by the holding portions.

In an embodiment of the disclosure, at least one of the carrying arms does not carry the second upper dies and the second lower dies, and at least one of the carrying arms is adapted to rotate to the pending position along the axial direction, so as to unload the first upper die and the first lower die to the holding portion of the at least one carrying arm.

In an embodiment of the disclosure, the punching portion further includes a first driving member and a second driving member, where the first driving member is adapted to drive the punching portion to move up and down along the first direction relative to the base portion, and the second driving member is adapted to drive the punching portion to pivotally rotate along the first direction.

In an embodiment of the disclosure, the base portion further includes a third driving member, which is adapted to drive the base portion to pivotally rotate along the first direction.

According to the above description, in the embodiments of the disclosure, the punching system includes the turret device, and the upper dies and the lower dies are respectively detachably installed on the turret device. The turret device drives the upper dies and the lower dies to move relative to the punching system, so as to automatically installing the upper dies and the lower dies on the punching portion and the base portion of the punching system. Moreover, when the upper dies and the lower dies completes punching material parts, the upper dies and the and the lower dies may be automatically unloaded back to the turret device from the punching portion and the base portion. Therefore, the punching system of the embodiments of the disclosure may automatically install and unload the upper dies and the lower dies used for punching the material parts. Therefore, the punching dies of the punching system can be quickly and automatically replaced, so as to save a time and labor costs for operating the punching system, such that the punching system of the embodiments of the disclosure is adapted to a production trial of small amount and diversified samples with a low price.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
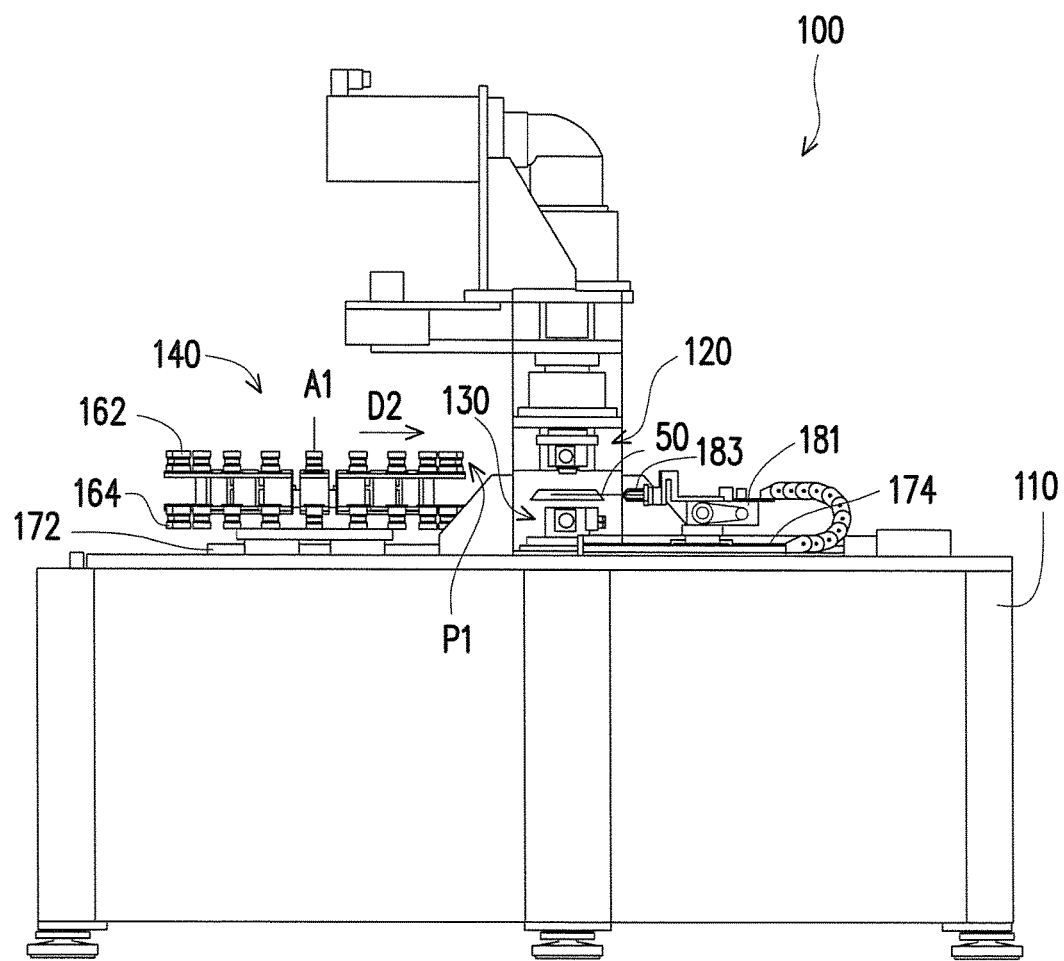
FIG. 1 is a schematic diagram of a punching system according to an embodiment of the disclosure.
Figure 2:
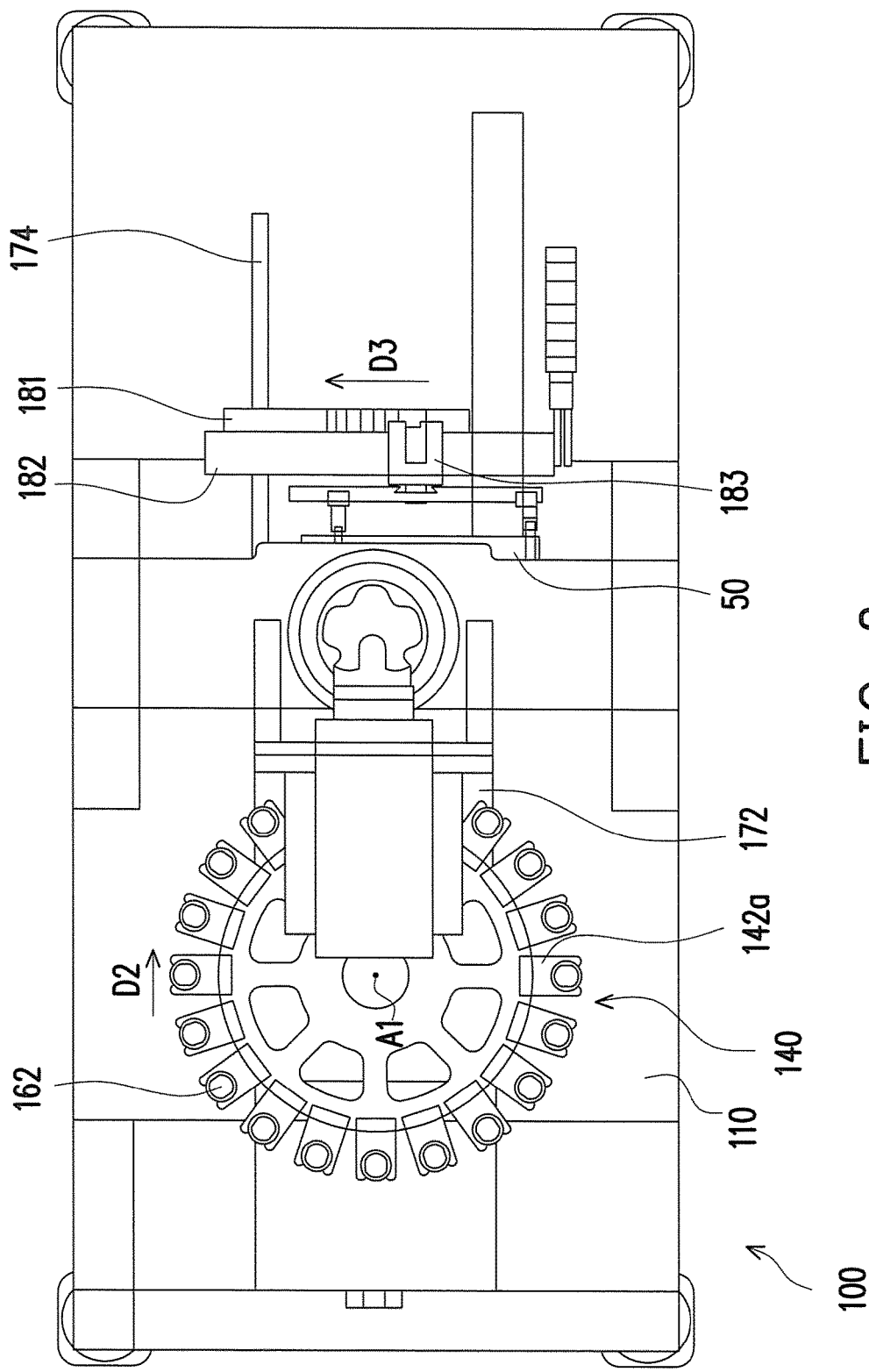
FIG. 2 is a top view of the punching system of FIG. 1.
Figure 3:
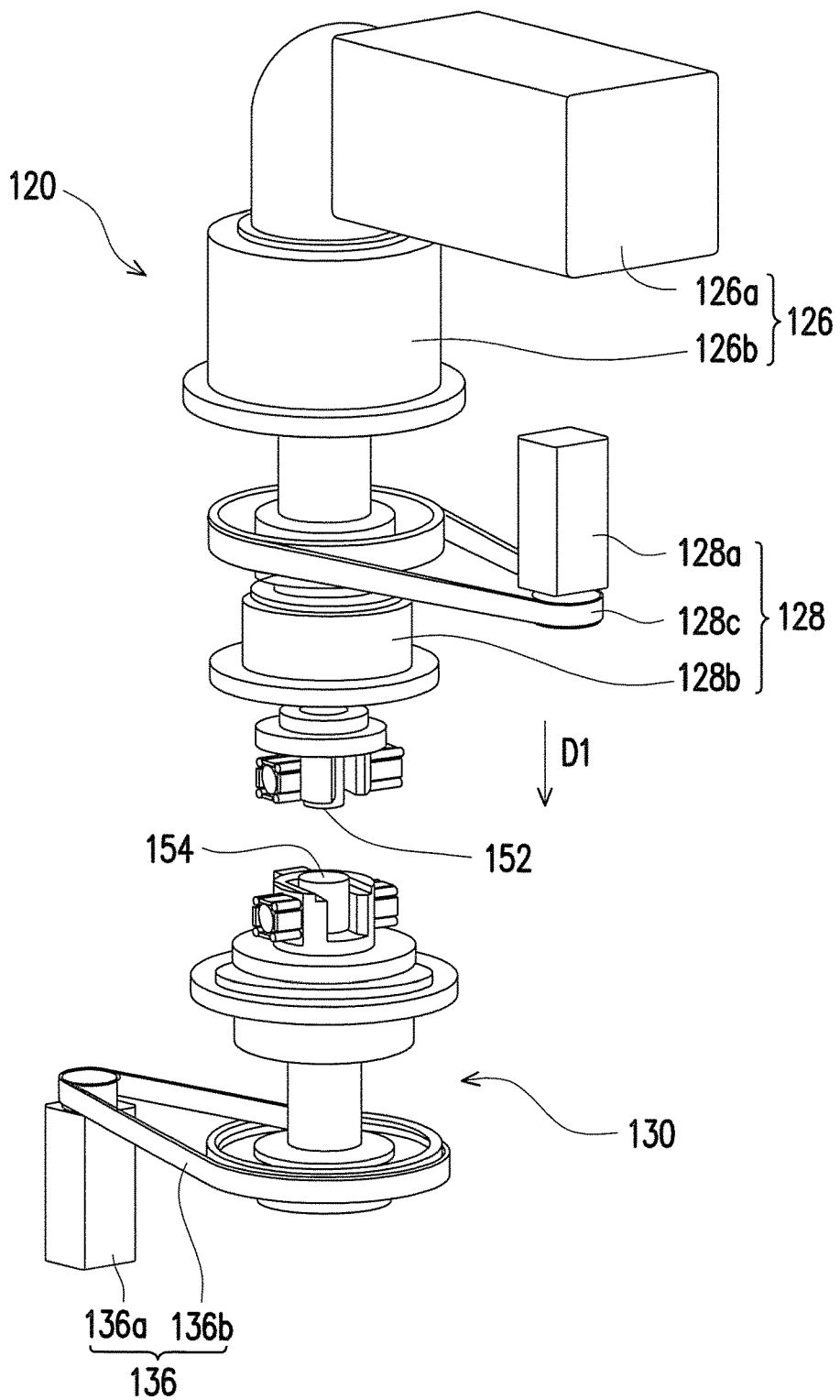
FIG. 3 is a schematic diagram of a part of components of the punching system of FIG. 1.

FIG. 1 is a schematic diagram of a punching system according to an embodiment of the disclosure. FIG. 2 is a top view of the punching system of FIG. 1. FIG. 3 is a schematic diagram of a part of components of the punching system of FIG. 1. Referring to FIG. 1 to FIG. 3, in the present embodiment, the punching system 100 is adapted to punch a sheet metal 50 to form the sheet metal 50. The punching system 100 includes a platform 110, a punching portion 120, a base portion 130 and a turret device 140. In the present embodiment, the punching portion 120 is disposed on the platform 110, and the base portion 130 is disposed between the punching portion 120 and the platform 110. Moreover, as shown in FIG. 3, a first upper die 152 is detachably installed in the punching portion 120, and a first lower die 154 is detachably installed in the base portion 130. In the present embodiment, the punching portion 120 is adapted to move back and forth along a first direction D1 relative to the base portion 130, so as to punch and form the sheet metal 50 by using the first upper die 152 and the first lower die 154.

Referring to FIG. 1 and FIG. 2, the turret device 140 is adapted to move along a second direction D2 relative to the platform 110, where the second direction D2 is orthogonal to the first direction D1. Moreover, a plurality of second upper dies 162 and a plurality of second lower dies 164 can be correspondingly disposed on the turret device 140. The turret device 140 may rotate along an axial direction A1 parallel to the first direction D1, so as to transfer the second upper die 162 and the second lower die 164 to be replaced to a pending position P1 on the turret device 140 (i.e. a position on the turret device 140 corresponding to the base portion 130), where the pending position P1 of the turret device 140 respectively corresponds to the punching portion 120 and the base portion 130. The turret device 140 may move along the second direction D2 towards the punching portion 120 and the base portion 130. The turret device 140 may unload the first upper die 152 and the first lower die 154 installed in the punching portion 120 and the base portion 130 to the turret device 140, and respectively install the second upper die 162 and the second lower die 164 at the pending position P1 of the turret device 140 in the punching portion 120 and the base portion 130, so as to complete replacing the first upper and lower dies 152, 154 with the second upper and lower dies 162, 164.

In the present embodiment, the punching system 100 further includes a first slide rail 172, and the first slide rail 172 is disposed between the turret device 140 and the platform 110 along the second direction D2. The turret device 140 is adapted to slide along the second direction D2 relative to the platform 110 through the first slide rail 172.

In the present embodiment, the punching system 100 further includes a carriage 181 and a second slide rail 174. The carriage 181 is disposed on the platform 110 to carry the sheet metal 50, and the second slide rail 174 is disposed between the carriage 181 and the platform 110. The carriage 181 is adapted to move along the second direction D2 relative to the platform 110 through the second slide rail 174. Moreover, a clamping portion 183 is movably disposed on the carriage 181, and the clamping portion 183 is used for clamping the sheet metal 50, so as to detachably fix the sheet metal 50 on the carriage 181.

In the present embodiment, the clamping portion 183 is adapted to move along a third direction D3 relative to the carriage 181, and the third direction D3 is orthogonal to the first direction D1 and the second direction D2. For example, a third slide rail 182 can be additionally configured between the clamping portion 183 and the carriage 181, and the clamping portion 183 may slide on the carriage 181 along the third direction D3 through the third slide rail 182. Therefore, the sheet metal 50 may move on a plane constructed by the second direction D2 and the third direction D3 through movement of the clamping portion 183 relative to the carriage 181 and movement of the carriage 181 relative to the platform 110. Moreover, in the present embodiment, the second slide rail 174 and the third slide rail 182 are, for example, ball screw guide rails.

Referring to FIG. 3, in the present embodiment, the punching portion 120 includes a first driving member 126 and a second driving member 128. In the present embodiment, the first driving member 126 is adapted to drive the punching portion 120 to move up and down along the first direction D1 relative to the base portion 130, and the second driving member 128 is adapted to drive the punching portion 120 to pivotally rotate along the first direction D1.

In detail, the first driving member 126 includes a first servo motor 126a and a screw assembly 126b, where the first servo motor 126a drives the screw assembly 126b to rotate, so as to drive the punching portion 120 to move up and down along the first direction D1 to punch the sheet metal 50. In the present embodiment, the screw assembly 126b is, for example, a ball screw.

The second driving member 128 may include a second servo motor 128a, a spline assembly 128b and a belt 128c. For example, the second servo motor 128a may drive the spline assembly 128b to rotate through the belt 128c, so as to drive the punching portion 120 to pivotally rotate along the first direction D1, such that the first upper die 152 (or the replaced second upper die 162) installed on the punching portion 120 rotates.

The base portion 130 has a third driving member 136, and the third driving member 136 includes a third servo motor 136a and a belt 136b. The third servo motor 136a is adapted to drive the base portion 130 to pivotally rotate along the first direction D1 through the belt 136b, such that the first lower die 154 (or the replaced second lower die 164) rotates. In the present embodiment, since the upper and lower dies on the punching portion 120 and the base portion 130 can be driven by the second driving member 128 and the third driving member 136 to rotate, besides that the punching system 100 may punch the sheet metal 50 along the first direction D1 (for example, a vertical direction), the punching system 100 may also perform punching processing to the sheet metal 50 in different angles through rotation of the upper and lower dies themselves.

Figure 4:
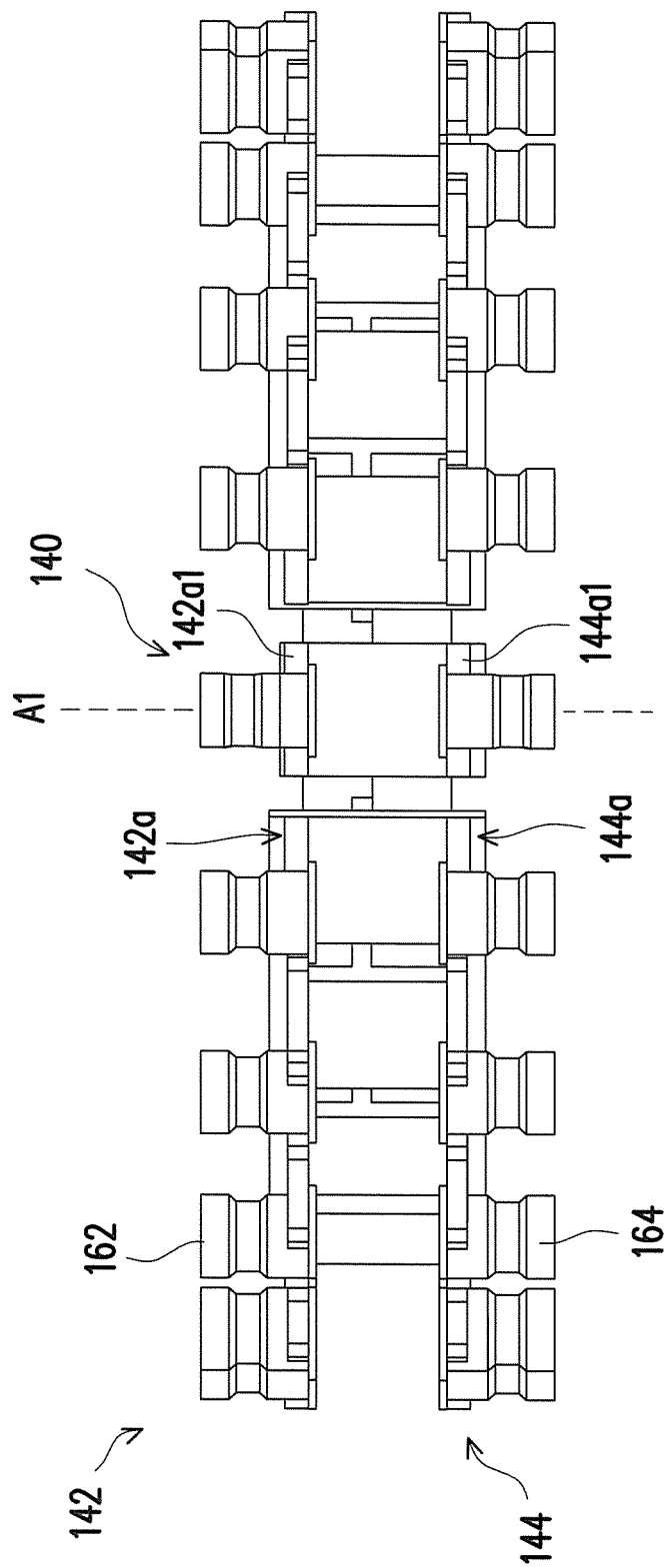
FIG. 4 is a side view of a turret device of the punching system of FIG. 1.
Figure 5:
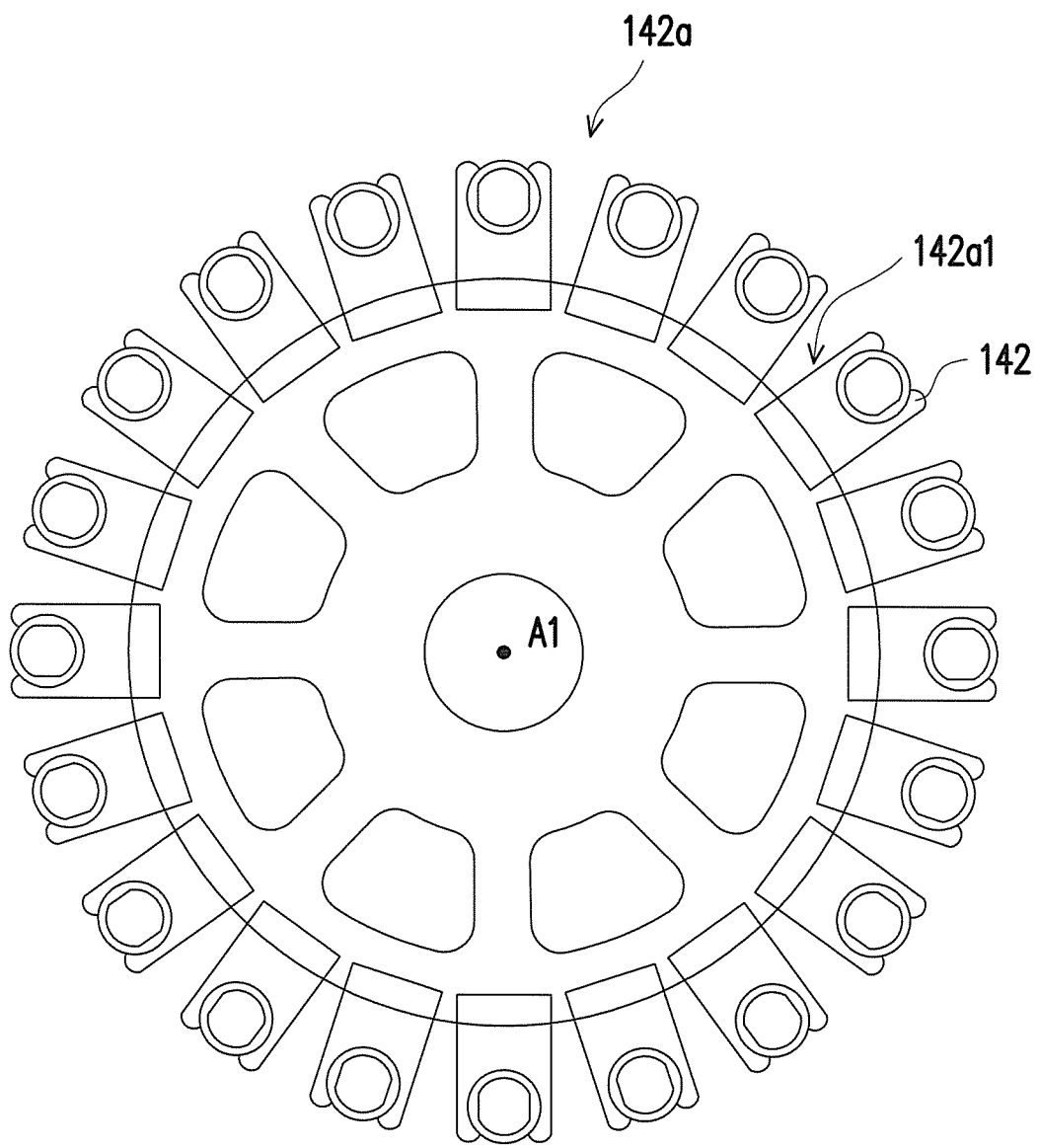
FIG. 5 is a top view of the turret device of the punching system of FIG. 1.

FIG. 4 is a side view of the turret device of the punching system of FIG. 1. FIG. 5 is a top view of the turret device of the punching system of FIG. 1. Referring to FIG. 4 and FIG. 5, in the present embodiment, the turret device 140 includes an upper turret portion 142 and a lower turret portion 144, where the upper turret portion 142 has a plurality of carrying arms 142a, and the lower turret portion 144 has a plurality of carrying arms 144a, and the carrying arms 142a and 144a respectively have holding portions 142a1 and 144a1. The second upper dies 162 and the second lower dies 164 can be detachably installed in the holding portion 142a1 of the upper turret portion 142 and the holding portion 144a1 of the lower turret portion 144, respectively.

Figure 6A:
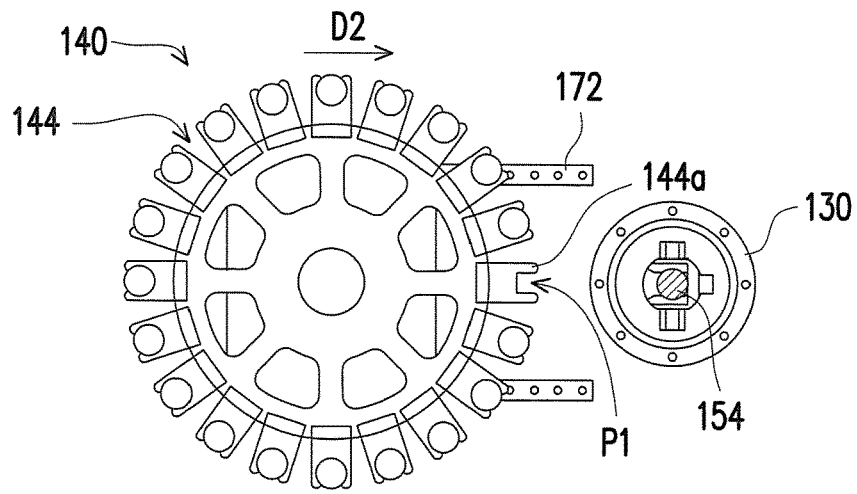
FIG. 6A to FIG. 6C are schematic diagrams illustrating a flow that the turret device unloads a die according to an embodiment of the disclosure.
Figure 6B:
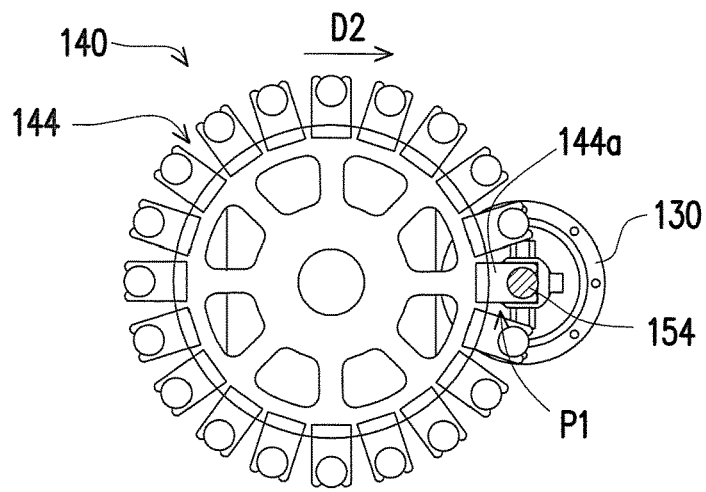
Figure 6C:
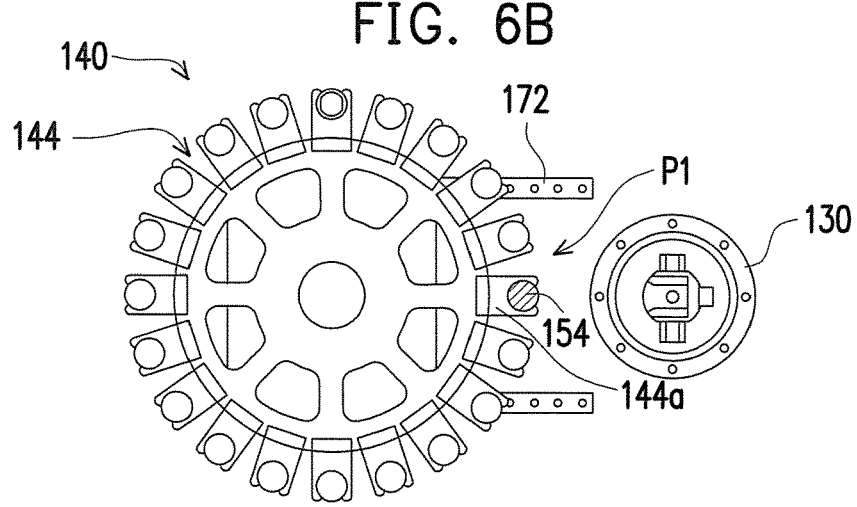

FIG. 6A to FIG. 6C are schematic diagrams illustrating a flow that the turret device unloads a die according to an embodiment of the disclosure. Referring to FIG. 6A and FIG. 6B, taking the lower turret portion 144 of the turret device 140 as an example, the lower turret portion 144 has a carrying arm 144a and the holding portion 144a1 thereof without carrying the second lower die 164. The carrying arm 144a without carrying the second lower die 164 can be rotated to the pending position P1 of the turret device 140 corresponding to the base portion 130. Then, the turret device 140 may move along the second direction D2 relative to the platform 110 towards the base portion 130, such that the carrying arm 144a located at the pending position P1 may enter into the base portion 130 to unload the first lower die 154 carried by the base portion 130 to the holding portion 144a1 of the carrying arm 144a.

As shown in FIG. 6C, after the first lower die 154 is unloaded to the lower turret portion 144 of the turret device 140, the turret device 140 may move back to its original position along a direction away from the base portion 130. Moreover, in the present embodiment, the first upper die 152 installed on the punching portion 120 can also be unloaded to the upper turret portion 142 of the turret device 140 according to a same method with that of the first lower die 154. Therefore, an unload flow that the first upper die 152 is unloaded to the turret device 140 from the punching portion 120 is not repeated.

Figure 7A:
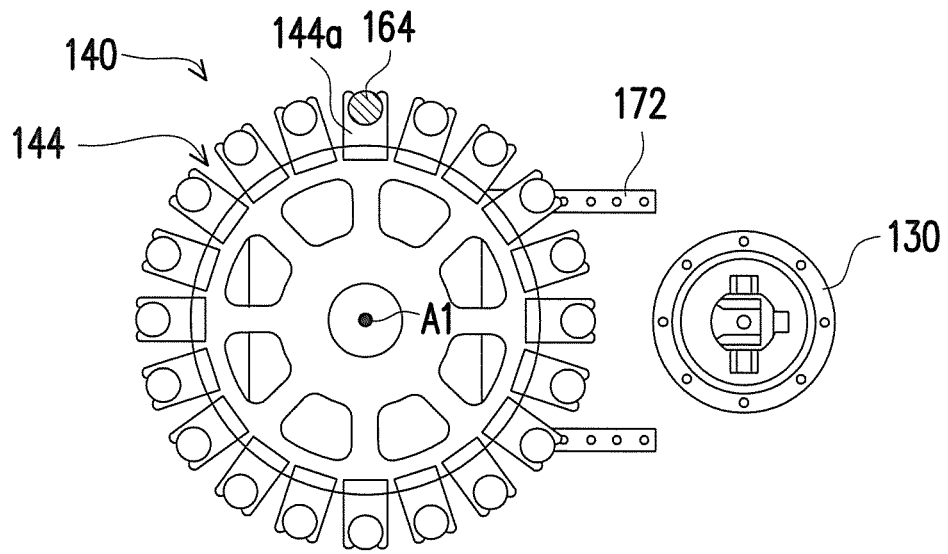
FIG. 7A to FIG. 7D are schematic diagrams illustrating a flow that the turret device loads a die according to an embodiment of the disclosure.
Figure 7B:
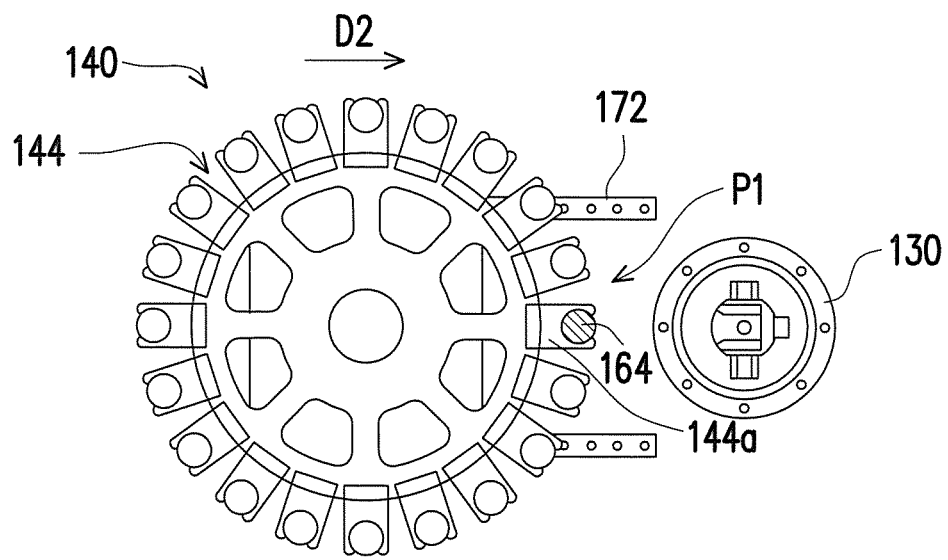

FIG. 7A to FIG. 7D are schematic diagrams illustrating a flow that the turret device loads a die according to an embodiment of the disclosure. In the present embodiment, after the first lower die 154 on the base portion 130 is unloaded to the lower turret portion 144 of the turret device 140 according to the flow shown in FIG. 6A to FIG. 6C, and the turret device 140 moves back to its original position along the first slide rail 172, the turret device 140 may further rotate along the axial direction A1 to rotate the second upper die 162 and the second lower die 164 to be installed to the pending position P1 of the turret device 140 as shown in FIG. 7B.

Figure 7C:
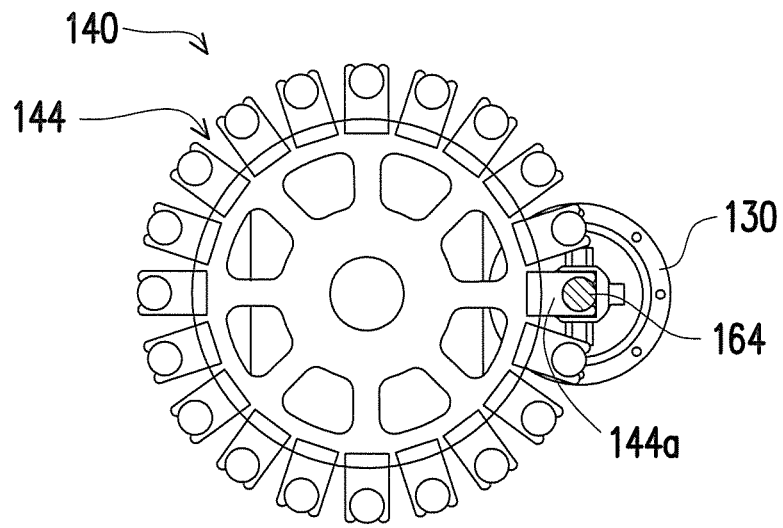

In detail, in FIG. 7A to FIG. 7D, the lower turret portion 144 of the turret device 140 is taken as an example for description. As shown in FIG. 7A and FIG. 7B, the lower turret portion 144 of the turret device 140 moves the second lower die 164 to be installed to the pending position P1 corresponding to the base portion 130 through rotation. Then, the turret device 140 moves along the second direction D2 relative to the platform 110 towards the base portion 130. Then, as shown in FIG. 7C, the carrying arm 144a carrying the second lower die 164 may move into the base portion 130 to load the second lower die 164 to the base portion 130.

Figure 7D:
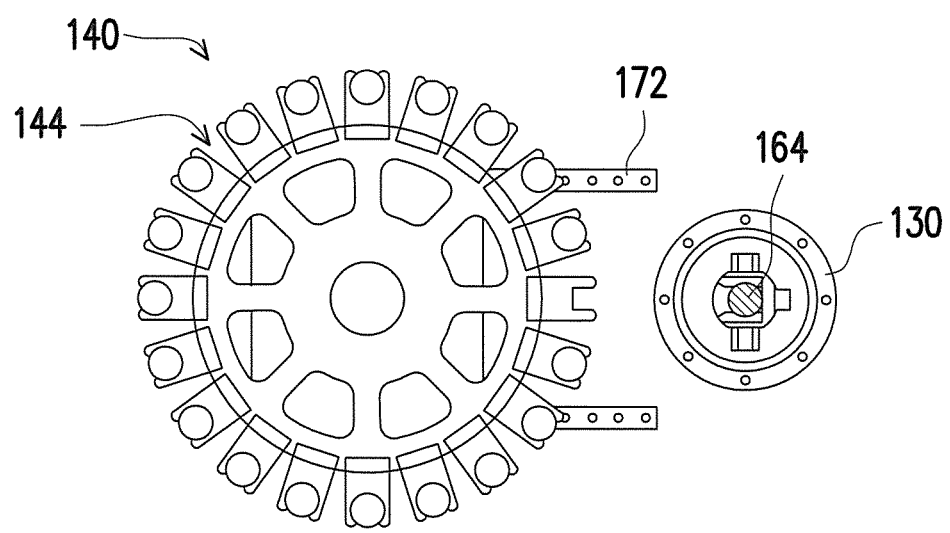

As shown in FIG. 7D, after the second lower die 164 is loaded to the base portion 130, the turret device 140 may further move along the first slide rail 172 in a direction away from the base portion 130, so that the turret device 140 returns back to its original position.

In the present embodiment, the second upper die 162 can also be loaded to the punching portion 120 according to the same flow as that of the second lower die 164. Therefore, the loading process of the second upper die 162 is not repeated. According to the above description, the first upper die 152 and the first lower die 154 originally installed on the punching portion 120 and the base portion 130 can be automatically replaced by the second upper die 162 and the second lower die 164 through unloading and loading processes of the turret device 140. Moreover, in the present embodiment, only the replacement flow of the first upper and lower dies 152, 154 and the second upper and lower dies 162 and 164 is taken as an example for description, and in other embodiments, the turret device 140 may simultaneously carry a plurality of other upper dies and lower dies with corresponding configurations according to various punching processing requirements.

In the present embodiment, since multiple types of upper dies and lower dies used for punching can be simultaneously installed on the turret device 140, and the upper and lower dies can be automatically installed in the punching portion 120 and the base portion 130 through the turret device 140, and after the punching procedure is completed, the turret device 140 automatically replaces the upper and lower dies to continue the punching processing flow of another type of the upper and lower dies, the punching system 100 of the present embodiment may quickly complete replacing and installing the dies to punch, so as to greatly decrease time and labor costs required for replacing the dies of the punching system 100.

In summary, in the embodiments of the disclosure, the punching system includes the turret device, and the upper and lower dies of a plurality of different types can be simultaneously and correspondingly installed on the upper and lower turret portions of the turret device. Moreover, the turret device may automatically load the corresponding upper and lower dies to the pouching portion and the base portion, and after the punching operation is completed, the turret device may automatically unload and replace the upper and lower dies. Therefore, in the embodiments of the disclosure, the time and labor costs required for unloading and replacing the punching dies of the punching system are greatly decreased. Therefore, the punching system may implement manufacturing small amount and diversified punching products by quickly and automatically completing replacement of the punching dies.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A punching system, adapted to punch a sheet metal, the punching system comprising:
   a platform;
   a punching portion, disposed on the platform, and a first upper die being detachably installed in the punching portion;
   a base portion, disposed between the punching portion and the platform, and a first lower die being detachably installed in the base portion, wherein the first upper die installed in the punching portion is adapted to move back and forth along a first direction relative to the base portion; and a turret device, adapted to move along a second direction relative to the platform, wherein the second direction is orthogonal to the first direction, and a plurality of second upper dies and a plurality of second lower dies are respectively and correspondingly installed on the turret device, the turret device is adapted to rotate about an axial direction parallel to the first direction, so as to transfer one of the second upper dies and one of the second lower dies to a pending position of the turret device respectively corresponding to the punching portion and the base portion, and the turret device is adapted to move along the second direction towards the punching portion and the base portion, so as to cause the turret device to respectively replace the first upper die and the first lower die with one of the second upper dies and one of the second lower dies.

2. The punching system as claimed in claim 1, further comprising:

a first slide rail, disposed between the turret device and the platform and along the second direction, wherein the turret device is adapted to slide, via the first slide rail, relative to the platform.

3. The punching system as claimed in claim 1, further comprising:

a carriage, disposed on the platform, and configured to carry the sheet metal, wherein the carriage is adapted to move along the second direction relative to the platform, the punching portion and the base portion.

4. The punching system as claimed in claim 3, further comprising:

a clamping portion, movably disposed on the carriage, and adapted to clamp the sheet metal to detachably fix the sheet metal on the carriage, wherein the clamping portion is adapted to move along a third direction relative to the carriage, and the third direction is orthogonal to the first direction and the second direction.

5. The punching system as claimed in claim 3, further comprising:

a slide rail, disposed between the platform and the carriage and along the second direction, wherein the carriage slides along the slide rail in the second direction relative to the platform.

6. The punching system as claimed in claim 1, wherein the turret device comprises an upper turret portion and a lower turret portion, and the second upper dies and the second lower dies are respectively detachably installed on the upper turret portion and the lower turret portion.

7. The punching system as claimed in claim 1, wherein the turret device comprises a plurality of carrying arms, and the carrying arms each have a respective holding portion, and the second upper dies and the second lower dies are each detachably fixed to a respective one of the holding portions.

8. The punching system as claimed in claim 7, wherein at least two of the carrying arms do not carry any of the second upper dies and the second lower dies, and the at least two of the carrying arms are adapted to rotate about the axial direction to the pending position, so as to unload the first upper die and the first lower die from the punching portion and the base portion to the respective holding portion of the at least two carrying arms.

9. The punching system as claimed in claim 1, wherein the punching portion further comprises a first driving member and a second driving member, wherein the first driving member is adapted to drive the first upper die to move up and down along the first direction relative to the base portion, and the second driving member is adapted to drive the first upper die to pivotally rotate about the first direction.

10. The punching system as claimed in claim 1, wherein the base portion further comprises a driving member adapted to drive the first lower die to pivotally rotate about the first direction.

* * * * *